United States Patent [19]

Roseveare

[11] Patent Number: 4,645,634
[45] Date of Patent: Feb. 24, 1987

[54] APPARATUS FOR MEASURING THE PITCH BETWEEN ADJACENT RODS IN A NUCLEAR FUEL ASSEMBLY

[75] Inventor: Ronald N. Roseveare, Evington, Va.

[73] Assignee: The Babcock & Wilcox Company, New Orleans, La.

[21] Appl. No.: 562,878

[22] Filed: Dec. 19, 1983

[51] Int. Cl.$^4$ ............................................. G21C 17/00
[52] U.S. Cl. .................................. 376/245; 376/252; 376/258
[58] Field of Search ................ 376/252, 258, 251, 245

[56] References Cited

U.S. PATENT DOCUMENTS

| | | | |
|---|---|---|---|
| 3,017,621 | 1/1962 | Taborsky et al. | 376/258 |
| 4,036,686 | 7/1977 | Weilbacher et al. | 376/251 |
| 4,193,843 | 3/1980 | Womack et al. | 376/252 |
| 4,205,304 | 5/1980 | Moore | 376/258 |
| 4,464,332 | 8/1984 | Boisseuil et al. | 376/251 |

Primary Examiner—Salvatore Cangialosi
Attorney, Agent, or Firm—Vytas R. Matas; Robert J. Edwards

[57] ABSTRACT

Apparatus for measuring the pitch between adjacent rods in a row of spaced-apart rods in a nuclear fuel assembly at selected points along the length of the rods, wherein the fuel assembly is relatively positioned angularly about its longitudinal center line with respect to a wand positionable to any selected point along the length of the rods carrying two spaced-apart, non-contact proximity sensors is transversely moved along the row of rods. An output signal of unique value is generated when the sensors are equally distant from a rod or adjacent rods. Means are provided for measuring the distance between the occurrence of the alternate unique signals as a measure of the pitch between adjacent rods.

7 Claims, 4 Drawing Figures

APPARATUS FOR MEASURING THE PITCH BETWEEN ADJACENT RODS IN A NUCLEAR FUEL ASSEMBLY

TECHNICAL FIELD

This invention relates to an apparatus for measuring the pitch between adjacent rods in a fuel assembly for a light water-cooled reactor and the like.

Such a measurement is of importance as variation in pitch between adjacent rods beyond established tolerances indicates that the coolant flow area, or coolant channel area as it is sometimes called, will likewise be beyond established tolerances thus causing maldistribution of coolant flow through the fuel assembly.

BRIEF SUMMARY OF THE INVENTION

In accordance with this invention there is provided a probe wand carrying two non-contacting closely spaced proximity sensors. As the wand traverses a row of rods in the fuel assembly, a unique output signal is produced when the sensors are equally distant from a rod or adjacent rods. Means are provided for measuring the distance between the occurrence of alternate unique signals as a measure of the pitch between adjacent rods.

DETAILED DESCRIPTION

Figure 1:
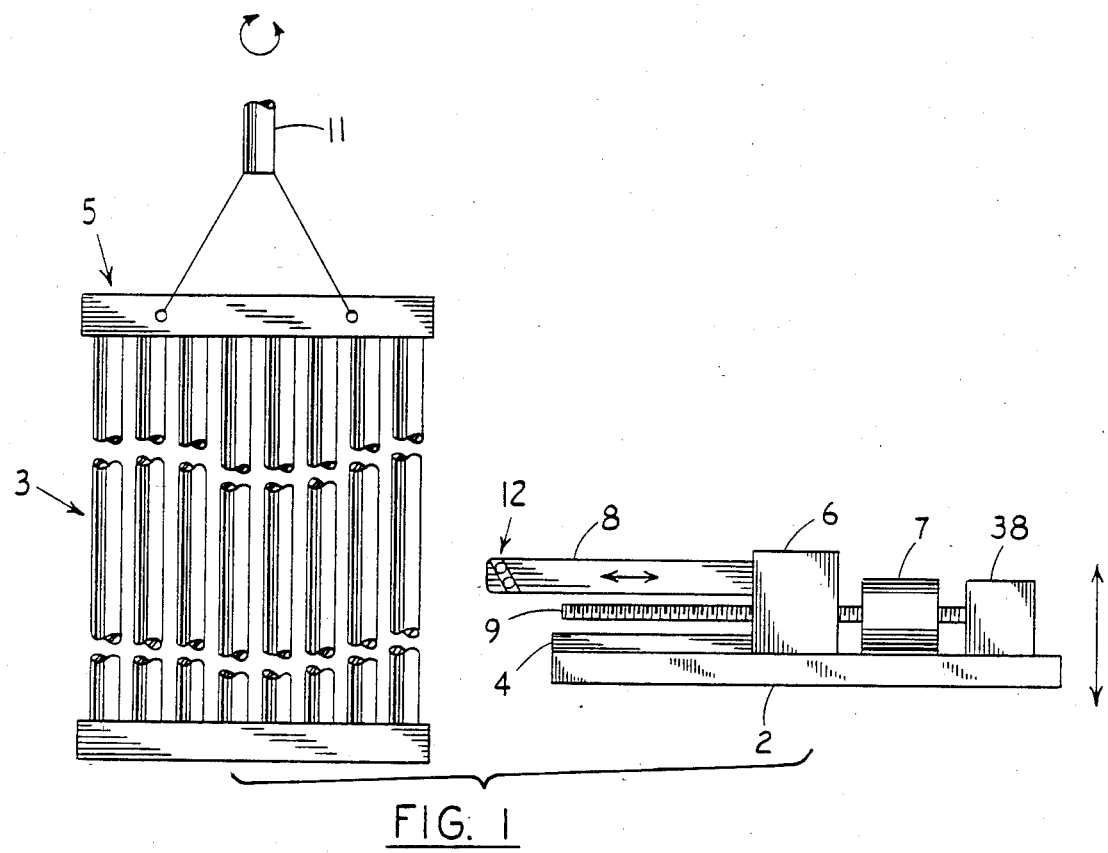
FIG. 1 is a side elevation view of part of an apparatus for scanning a row of rods in a nuclear fuel assembly.
Figure 2:
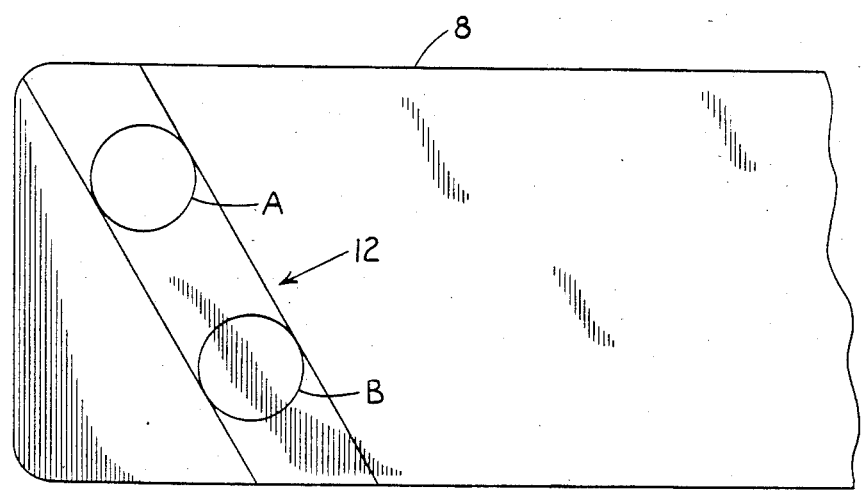
FIG. 2 is a fragmentary side view to larger size of the probe wand shown in FIG. 1.

A fuel assembly for a light water-cooled reactor, for instance, typically consists of an array of 15×15 closely spaced fuel rods having an active length of about 144 inches. Included in an array may be a control rod guide tube and an instrumentation tube which, for purposes of this invention, may be considered as rods.

It has long been recognized that following fabrication and periodically during use, the rods may be inspected at several points along their length to determine if any abnormalities are present, the severity thereof, and what corrective action, if any, must be taken. An apparatus for inspecting the rods in a fuel assembly at several points along their length is illustrated and described in U.S. Pat. No. 4,193,843. As the apparatus so illustrated and described can be used in connection with this invention in the interest of brevity only so much of the apparatus as is necessary for an understanding of this invention is herein illustrated and described.

Referring now to the drawings, wherein like reference characters designate like or corresponding parts throughout the several views, there is shown a support plate 2 which can be elevated by means such as illustrated and described in the U.S. Pat. No. 4,193,843, to selected points along the length of the row of fuel rods 3 in a fuel assembly, generally indicated at 5, suspended from a rotatable mast 11. The support plate 2 is provided with ways 4 on which is slidably mounted a carriage 6, shown in a retracted position, carrying a wand 8 provided near its free end with a compound non-contacting proximity sensor, generally indicated at 12 provided with responsive elements A and B spaced apart less than the diameter of the rod having the smallest diameter in the row of rods 3. As the carriage 6 is moved from the retracted position to an extended position, or vice versa, by any suitable means, such as a reversing motor 7 and a lead screw 9, the responsive elements A and B consecutively pass by each of the tubes in the row of tubes 3, each producing an electrical effect proportional to its proximity to the tube.

Figure 4:
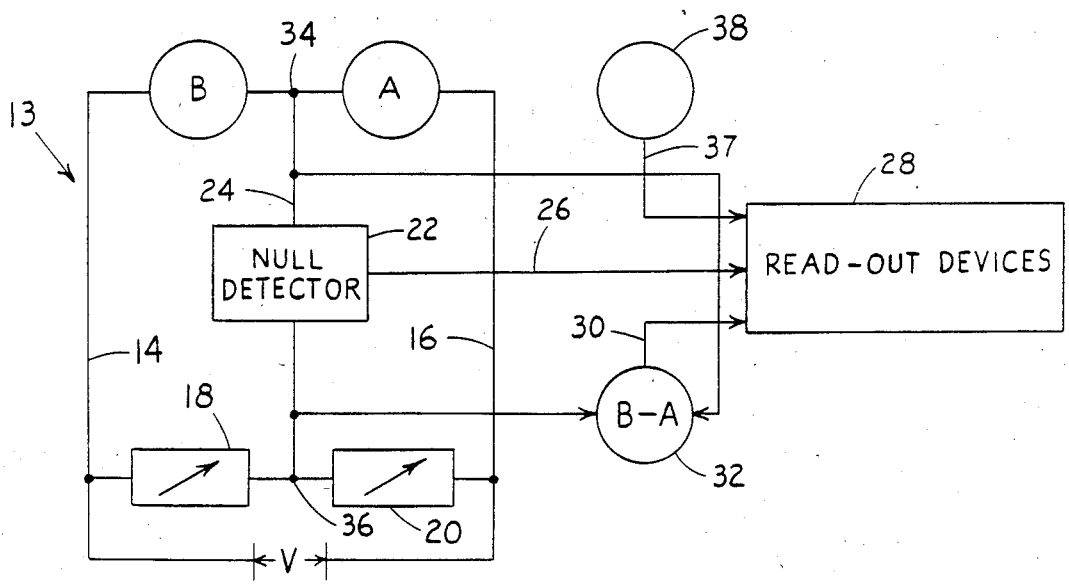
FIG. 4 is a simplified, elementary one-line wiring diagram for producing selected output signals.

Any one of a variety of circuits may be used to generate from the electrical effects produced by responsive elements A and B selected output signals. Representative of such circuits, there is shown in FIG. 4 responsive elements A and B serially connected in a bridge circuit generally indicated at 13, energized through supply leads 14 and 16 from any suitable source of current (not shown). Also serially connected in series across leads 14 and 16 are adjustable balancing impedances 18 and 20. With the bridge in balance when responsive elements A and B are equidistant from a target, such as a rod or two adjacent rods, a null detector 22 in conjugate conductor 24 generates a unique signal which may be transmitted through lead 26 to read out devices shown schematically at 28. There may be included a difference unit 32 generating a signal, transmitted through lead 30 to the devices 28 proportional to the difference in potential between connections 34,36.

To correlate such signals with the distance traveled by the wand 8 in traversing the row of tubes 3 there is also introduced into the devices 28 through lead 37 a signal generated by an encoder 38 mechanically driven from the lead screw 9. As evident other devices, such an an LVDT (linear voltage differential transformer) having an armature, for example, attached to the carriage 6 and stationary coils supported from the platform could also be used to generate a signal proportional to the distance traveled by the wand 8 in making a traverse.

Figure 3:
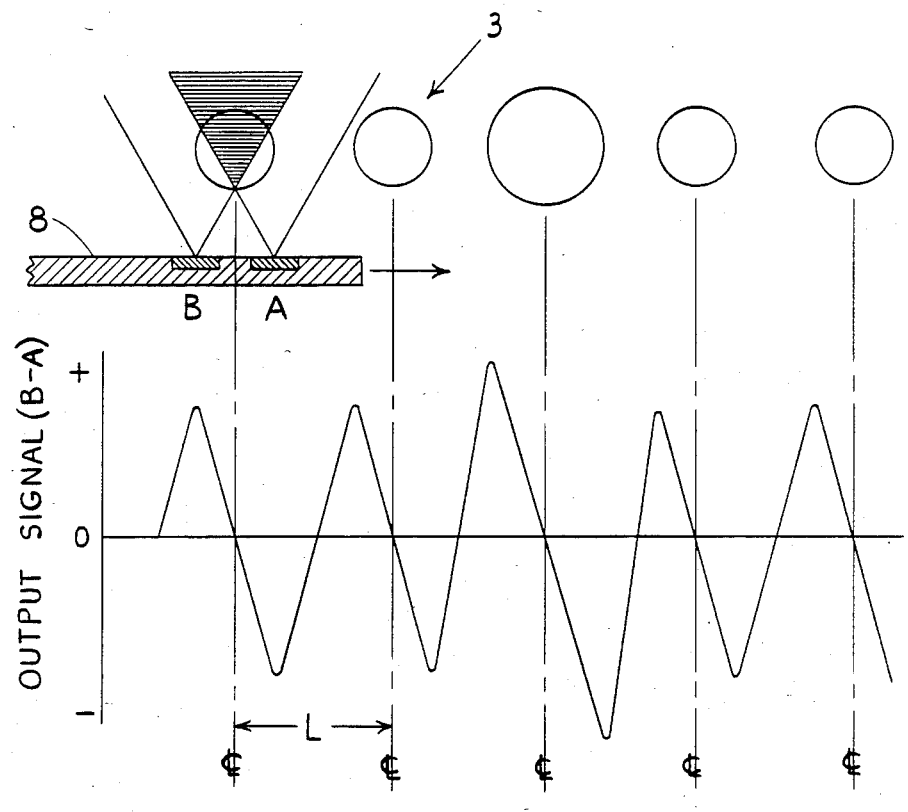
FIG. 3 is a schematic useful in explaining this invention.

As shown schematically in FIG. 3, when the responsive elements A and B are equally distant from a rod, or from adjacent rods, a unique output signal from difference unit 32 is produced having, for purposes of illustration, a value of zero. Similarly, when responsive elements A and B are equally distant from adjacent rods the output signal from difference unit 32 will be zero. Thus by correlating wand travel with zero crossover points, the pitch between adjacent rods at selected points along the length of the rods is determined.

The selection of a particular type of sensor employed depends primarily upon the ambient conditions surrounding the fuel assembly. If the fuel assembly is submerged in the coolant, an ultrasonic or an eddy current sensor would probably be preferable, whereas a capacitance or an eddy current sensor would probably by preferable in a dry environment.

As the fual assembly 5, when in test position, is suspended from a rotatable mast 11, by rotating the assembly through 90° increments different sets of rows of rods will be presented for scanning by the wand 8.

While a single wand 8 has been illustrated and described it should be recognized, as shown in U.S. Pat. No. 4,193,843, a plurality of parallel wands sufficient in number to simultaneously scan one set of the row of rods in the fuel assembly would ordinarily be used in practicing this invention.

I claim:

1. Apparatus for measuring the pitch between adjacent rods in a row of spaced-apart rods in a nuclear fuel assembly, comprising:

a support plate;
a carriage;
a wand, dimensioned to traverse the row of rods, extensibly appended from the carriage, the carriage being slidably mounted on the support plate for transversely moving the wand along the row of rods;
a pair of spaced-apart, non-contacting proximity sensors, spaced apart less than the outside diameter of the rod of smallest diameter in the row of rods, attached to said wand to consecutively pass by each of the rods in the row of rods for generating a first and a second output signal, respectively, corresponding to each sensor's proximity to a rod as it passes by the rod; and
means for measuring the linear movement of said carriage in transversely moving the wand along the row of rods to relate the position of said pair of spaced-apart, non-contacting proximity sensors to the output signals generated thereby.

2. Apparatus as set forth in claim 1 further including means for generating a third output signal proportional to an algebraic sum of a first and second signal from said pair of spaced-apart, non-contacting proximity sensors.

3. Apparatus as set forth in claim 2 further including means for generating a unique signal when said first and second signals are of equal magnitude.

4. Apparatus as set forth in claim 3 wherein said unique signal is generated when the sensors in said pair of spaced-apart, non-contacting proximity sensors are equally distant from a rod in the row of rods.

5. Apparatus as set forth in claim 1 wherein said pair of spaced-apart, non-contacting proximity sensors are ultrasonic sensors.

6. Apparatus as set forth in claim 1 wherein said pair of spaced-apart, non-contacting proximity sensors are eddy current sensors.

7. Apparatus as set forth in claim 1 wherein said pair of spaced-apart, non-contacting proximity sensors are capacitance-type sensors.

* * * * *